UNITED STATES PATENT OFFICE.

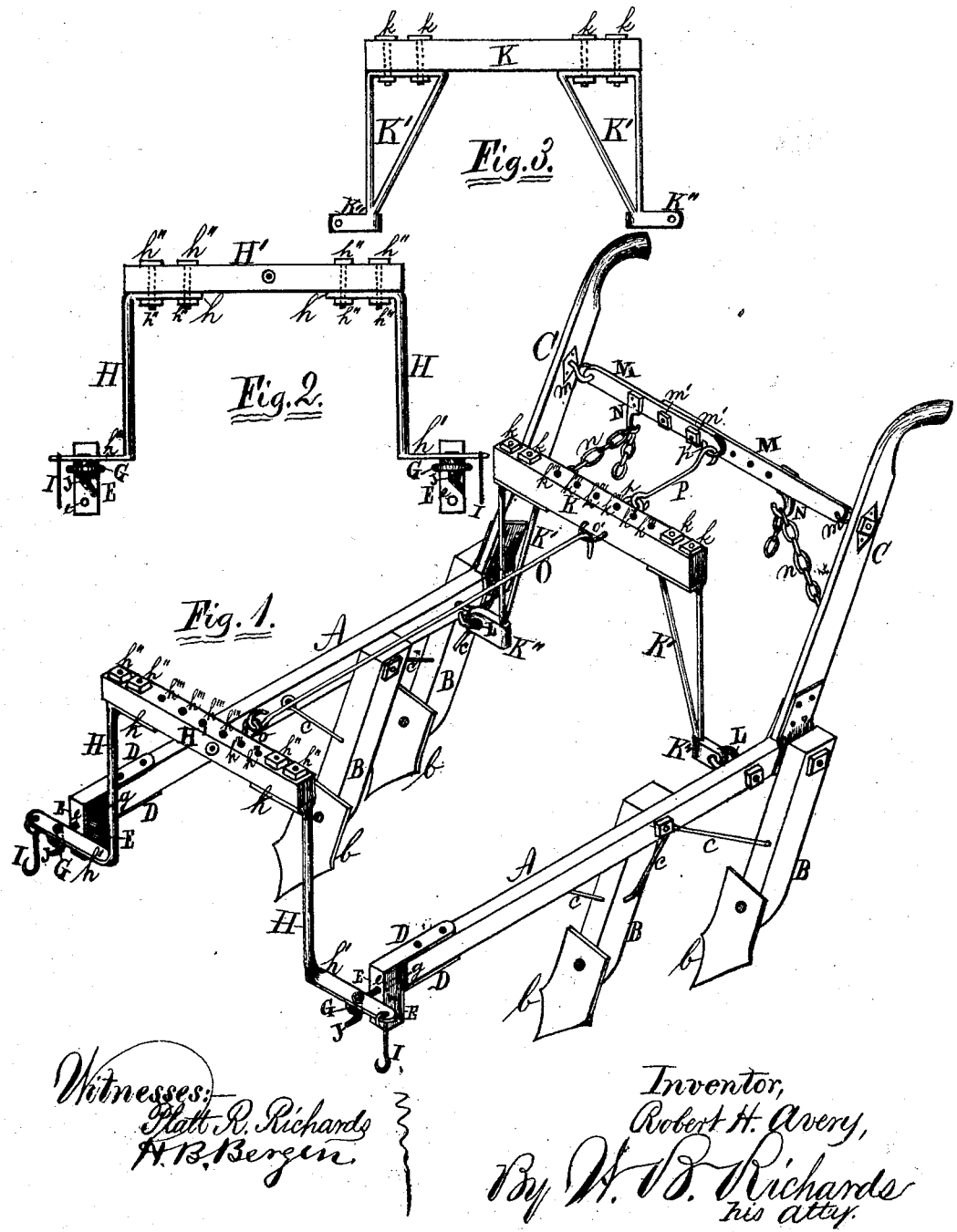

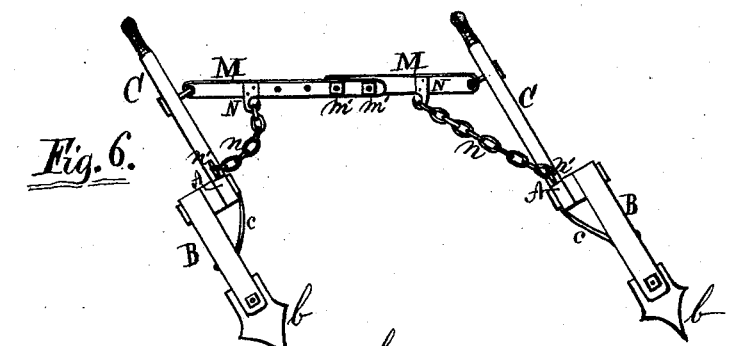
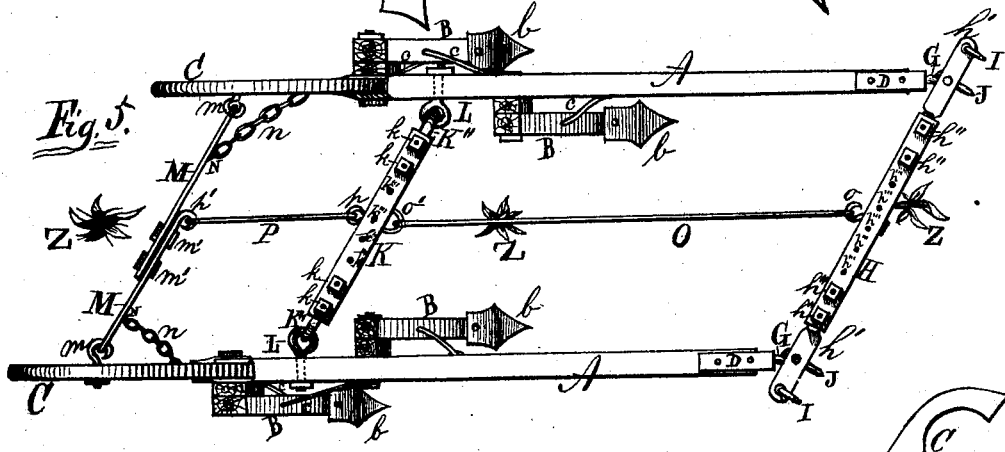
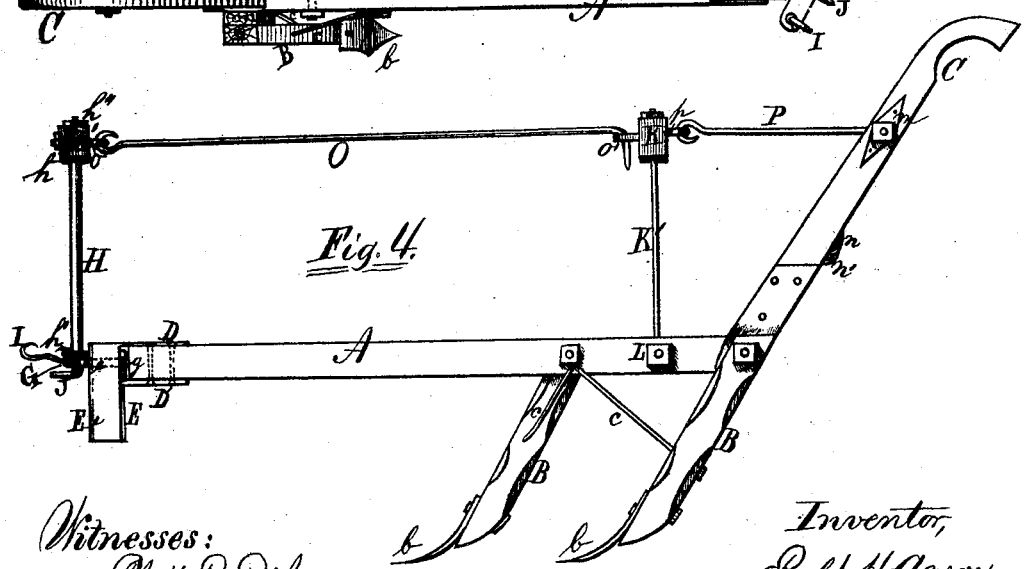

ROBERT H. AVERY, OF GALESBURG, ILLINOIS.

IMPROVEMENT IN CULTIVATORS.

Specification forming part of Letters Patent No. 110,419, dated December 27, 1870.

I, ROBERT H. AVERY, of Galesburg, in the county of Knox and State of Illinois, have invented certain Improvements in Cultivators, of which the following is a specification:

Nature and Objects of the Invention.

The nature of my invention relates to improvements in that class of cultivators in which two cultivator-plows are connected and arranged for cultivating both sides of a row of plants simultaneously, the whole being drawn by two draft-animals, traveling one on each side of the row of plants being cultivated; and the invention consists, first, in connecting the plows by means of elevated couplings, which will pass over the plants after they are some height, and which, at the same time that they allow an independent movement of the plows to some extent, still bring both plows under the control of the operator having hold of the handle of the one, all as hereinafter fully described; second, it consists in connecting said elevated couplings in such manner, and in pivoting the forward coupling to the plow-beams in such manner, that the draft of the team may serve to keep the couplings and the plows in a steady, firm, working position; third, it consists in the arrangement of devices for adjusting the distance of the plows apart, all as hereinafter fully described; fourth, it consists in the arrangement of devices for adjusting the depth of running, all as hereinafter fully described; fifth, it consists in an arrangement of chains or cords, with the rear coupling and handles to prevent the plows dropping too far over to either side.

Description of the Accompanying Drawing.

Figure 1 is a perspective view of a machine embodying my invention. Fig. 2 is an elevation of the forward coupling and the plates and eyebolts by which it is attached to the beams. Fig. 3 is an elevation of the middle or central coupling. Fig. 4 is a side elevation of Fig. 1. Fig. 5 is a top view, showing one of the plows advanced. Fig. 6 is a rear view of detached parts, showing the plows inclined to the left at the top.

General Description.

A A represent the beams; B B B B, the shanks; and C C, the handles of ordinary cultivator-plows, with shovels or cultivating-teeth $b\ b\ b\ b$ and the ordinary braces $c\ c\ c\ c\ c\ c$.

D D are plates projecting from the upper and lower sides of the ends of the beams A A, and carrying on their outer ends the vertical plates E E, which are pierced with holes $e\ e\ e\ e$ for the reception of the eyebolts G G, which are held in place by the nuts $g\ g\ g\ g$. H H are vertical rods, with their upper ends, $h\ h$, bent at right angles, and their lower ends, $h'\ h'$, bent also at right angles and opposite to the upper ends, $h\ h$. The upper ends of the rods H H support the bar H'. The distance of the rods H H apart may be adjusted by bolts and nuts $h''\ h''\ h''\ h''$ and holes $h'''\ h'''\ h'''\ h'''$. I I are hooks, to which the single-trees, connecting the draft-animals with the plows, are attached. J J are hooks extending from the under side of the plates $h'\ h'$ and passing through the eyes of the eyebolts G G. K is a bar supported on brackets K' K', and provided with bolts and nuts $k\ k\ k\ k$ and holes $k'''\ k'''\ k'''\ k'''$, by means of which the distance of the brackets K' K' apart may be adjusted.

K'' K'' are plates on the lower ends of the brackets K' K', and are pierced with holes, by which they are pivoted to the beams A A by means of the eyebolts L L. M M are bars pivoted to the handles C C near their upper ends by the eyebolts $m\ m$, and adjustably connected near their centers by bolts and nuts $m'\ m'$. N N are hooks connected to the bars M M, and from which chains $n\ n$ extend to hooks or eyes $n'\ n'$ on the rear sides of the handles C C. O is a rod, its forward end formed into an eye and connected to the rear side of the bar H by an eyebolt, $o$, its rear end bent into a hook form and engaging with an eye, $o'$, on the forward side of the rod K. P is a rod, the forward end of which has an eye engaging with an eyebolt, $p$, on the rear side of the bar K, and its rear end turned into an eye engaging with a hook, $p'$, on the end of one of the bars M.

The advantages and the operation of my invention are as follows:

In the first place, it will be plainly seen from the drawing, especially Fig. 5, that either plow may be advanced, and at the same time the beams A A remain parallel with each other and with the row of plants Z Z Z, and that each draft-animal, under all ordinary circumstances, will have the one plow to draw, being connected directly to the ends of the beams, dispensing with the ordinary draft-pole, and, consequently, removing entirely that great source of annoyance in ordinary cultivators—the neck-draft on the team—and further dispensing with the ordinary expensive frame and wheels, while the connections between the plows are such that it will be plainly seen that, while either plow may have a somewhat independent movement, especially longitudinally with the beams, still the operator may control easily both plows with one hand, and, by simply inclining the plows, as shown at Fig. 6, by drawing on one of the handles C, the plows may be directed to the right or left to avoid hills which are out of line, and that, when the plows are inclined, as shown at Fig. 6, one of the chains $n$ will always be drawn taut and prevent the possibility of too great inclination.

The linking together of the elevated couplings by the rods O and P, and the resistance of the plows to the forward motion of the draft-animals, and the sustaining pressure of the operator on the plow-handles will give rigidity to all parts of the machine.

To take the plows apart, for convenience in moving from field to field, it is only necessary to lift the hook on the rod O out of the ring $o'$ and the hooks J J out of the eyebolts G G, when the forward coupling may be removed and the plows be easily handled, or they may be taken entirely apart by releasing one of each of the eyebolts L and M.

As shown in the drawing, with the inside cultivator-teeth and shanks in advance of the rear ones and the shovels properly set, the dirt or soil will be thrown to the row of plants; but, by releasing the couplings, the plows may be changed with their other sides to, and be made to throw the dirt in, the opposite direction.

What I claim as my invention is—

1. The combination and arrangement of the elevated couplings H', K, and M and connecting or link rods O and P with the plow-beams A of a cultivator, as and for the purpose substantially as set forth.

2. The chains $n\ n$, when combined and arranged to operate with the rods or bars M M and handles C C, and elevated couplings H and K, substantially as described, and for the purpose specified.

ROBERT H. AVERY.

Witnesses:
P. R. RICHARDS,
H. B. BERGER.